United States Patent
Povey et al.

(10) Patent No.: US 11,238,137 B2
(45) Date of Patent: Feb. 1, 2022

(54) ENABLING PROGRAM CODE ON TARGET DATA PROCESSING DEVICES

(71) Applicant: SECURE THINGZ LIMITED, Cambridge (GB)

(72) Inventors: Haydn Povey, Cambridge (GB); Steve Pancoast, Cedar Park, TX (US); Mike Moreton, Cambridge (GB); Timothy John Woodruff, Cambridge (GB)

(73) Assignee: SECURE THINGZ LIMITED, Cambridge (GB)

( * ) Notice: Subject to any disclaimer, the term of this patent is extended or adjusted under 35 U.S.C. 154(b) by 202 days.

(21) Appl. No.: 16/495,328

(22) PCT Filed: Apr. 11, 2018

(86) PCT No.: PCT/GB2018/050967
§ 371 (c)(1),
(2) Date: Sep. 18, 2019

(87) PCT Pub. No.: WO2018/189539
PCT Pub. Date: Oct. 18, 2018

(65) Prior Publication Data
US 2020/0026825 A1    Jan. 23, 2020

(30) Foreign Application Priority Data

Apr. 11, 2017    (GB) ...................................... 1705875

(51) Int. Cl.
*G06F 21/12*    (2013.01)
*G06F 21/10*    (2013.01)
(Continued)

(52) U.S. Cl.
CPC .......... *G06F 21/123* (2013.01); *G06F 21/105* (2013.01); *G06F 21/125* (2013.01);
(Continued)

(58) Field of Classification Search
CPC .... G06F 21/123; G06F 21/105; G06F 21/125; G06F 21/34; G06F 21/602; G06F 21/72; G06F 2221/2107
(Continued)

(56) References Cited

U.S. PATENT DOCUMENTS

| | | | | |
|---|---|---|---|---|
| 2002/0199110 A1* | 12/2002 | Kean | ........................ | G06F 21/76 |
| | | | | 713/189 |
| 2006/0020556 A1* | 1/2006 | Hamnen | .................. | G06F 21/10 |
| | | | | 705/59 |

FOREIGN PATENT DOCUMENTS

| | | |
|---|---|---|
| EP | 1 703 478 A2 | 9/2006 |
| WO | WO 2018/189539 A1 | 10/2018 |

OTHER PUBLICATIONS

International Search Report and Written Opinion for Int'l Application No. PCT/GB2018/050967, titled: Enabling Program Code on Target Data Processing Devices, dated May 29, 2018.

\* cited by examiner

*Primary Examiner* — Michael S McNally
(74) *Attorney, Agent, or Firm* — Hamilton, Brook, Smith & Reynolds, P.C.

(57) ABSTRACT

A method of enabling program code stored on target data processing devices, the method comprising: receiving an in encrypted value of a permitted number of target data processing devices that are permitted to have program code stored on them enabled, and using a security data processing device to decrypt the encrypted value and store the decrypted value on the security data processing device; and for each target data processing device, using the security data processing device to: determine whether the value of the permitted number of target data processing devices is greater than zero; if so, obtain a device identifier from the target data processing device; generate a license key from (Continued)

the device identifier; store the license key on the target data processing device; and decrement the value of the permitted number of target data processing devices.

19 Claims, 3 Drawing Sheets

(51) Int. Cl.
  *G06F 21/34* (2013.01)
  *G06F 21/60* (2013.01)
  *G06F 21/72* (2013.01)

(52) U.S. Cl.
  CPC ............ *G06F 21/34* (2013.01); *G06F 21/602* (2013.01); *G06F 21/72* (2013.01); *G06F 2221/2107* (2013.01)

(58) Field of Classification Search
  USPC ........................................................ 713/189
  See application file for complete search history.

ENABLING PROGRAM CODE ON TARGET DATA PROCESSING DEVICES

This application is the U.S. National Stage of International Application No. PCT/GB2018/050967, filed on Apr. 11, 2018, which designates the U.S., published in English, and claims priority under 35 U.S.C. § 119 or 365(c) to Great Britain Application No. 1705875.1, filed on Apr. 11, 2017. The entire teachings of the above applications are incorporated herein by reference.

TECHNICAL FIELD

The present disclosure relates to enabling program code on target data processing devices using a security data processing device.

BACKGROUND

Modern software often checks that the user is in possession of a license key before allowing itself to run, or enabling certain features of itself. In the case of software embedded into a data processing device (for example a washing machine), the license key is generally also embedded into the data processing device so that possession of the data processing device implicitly authorises the use of the software that is embedded into the data processing device.

In addition, where the data processing device has some unique identity, it is advantageous to somehow integrate this identity into the license key so that the embedded software can check both that there is a valid license, and that the license is for the data processing device on which the software is currently executing. This prevents a valid license key being copied across to another data processing device—for example to enable features that were licensed on the source device, but not on the destination.

It's clear that these license keys have a value, because they allow software or optional features of that software to run on a device. However these license keys normally need to be generated in a third party manufacturing facility, either because of policy, or because the key includes information such as the unique identifier that is only available during the manufacturing process. For example the unique id may come pre-programmed into a reel of devices, where one of these devices is added to the data processing device during manufacture.

SUMMARY OF THE INVENTION

The inventors have identified that, currently, the original designer of a product has to trust the third party manufacturer not to generate additional licenses and hence manufacture additional devices which can be sold on the grey market. Experience has shown that this trust is often misplaced, so some mechanism for preventing this is of value to the original designer.

The present disclosure relates to a method for secure generation of software license keys at a third party manufacturing site.

Embodiments of the present disclosure are directed to the provision in the factory of a mechanism to generate license keys that the original designer can trust not to generate keys in excess of an authorised count provided by the original manufacturer. This may be achieved by the provision of a security data processing device to the third party manufacturer which the only method of accessing is to optionally provide a device identity, and receive a license key in return.

The security data processing device (e.g. an HSM) keeps a count of the number of devices which license keys can be generated for, and when this count is expired, refuses to supply any more license keys.

When the original designer wants to authorise the manufacture of more devices, they can supply a new count encrypted in one of the standard ways so that the receiving security data processing device can validate that the count was sent by the original designer, and only the target security data processing device (or devices of its class) can decrypt the count.

As well as the count, it's desirable for the original designer to supply the firmware image for programming into the data processing device. This image may be split into multiple parts where one part is responsible for license validation, and the other part(s) each implement one or more features of the software.

It's also possible for the original designer to send instructions for how to generate a license key (e.g. a script) to the security data processing device so that the original designer can change the means of generating a license key without obtaining a new version of the security data processing device.

Alternatively, with some low price security data processing devices (e.g. a smart card) it would be feasible for the original designer to pre-install the count before sending it to the third party manufacturer, and to send out a new security data processing device every time an additional count is required.

According to a first aspect of the invention there is provided a method of enabling program code stored on target data processing devices, the method comprising:

receiving an encrypted value of a permitted number of target data processing devices that are permitted to have program code stored on them enabled, and using a security data processing device to decrypt the encrypted value and store the decrypted value on the security data processing device; and for each target data processing device, using the security data processing device to: determine whether the value of the permitted number of target data processing devices is greater than zero;

if so, obtain a device identifier from the target data processing device;

generate a license key from the device identifier;

store the license key on the target data processing device; and decrement the value of the permitted number of target data processing devices.

Using the security data processing device to generate the license key from the device identifier may advantageously comprise generating the license key by executing instructions stored on the security data processing device by a provider of the security data processing device.

The method may advantageously comprise receiving encrypted instructions for execution by the security data processing device, using the security data processing device to decrypt the encrypted instructions and store the decrypted instructions on the security data processing device, and using the security data processing device to generate the license key from the device identifier comprise generating the license key by execution of the decrypted instructions.

According to a second aspect of the invention there is provided a method of enabling program code stored on target data processing devices, the method comprising:

receiving a security data processing device on which are stored a value of a permitted number of target data processing devices that are permitted to have program code stored on them enabled and instructions for execution by the security data processing device to generate a license key from a device identifier; and for each target data processing device, using the security data processing device to: determine whether the value of the permitted number of target data processing devices is greater than zero;

if so, obtain a device identifier from the target data processing device;

generate a license key from the device identifier;

store the license key on the target data processing device; and decrement the value of the permitted number of target data processing devices.

The invention can provide a method of enabling program code stored on target data processing devices, which method, provided that appropriate security and target data processing devices are used, allows a provider of program code to use an untrusted entity to enable program code stored on target data processing devices but to make difficult enablement by the untrusted entity of program code stored on more than a permitted number of the target data processing devices.

The method of the first aspect may advantageously further comprise receiving encrypted further program code for storage on the target data processing devices, using the security data processing device to decrypt the encrypted further program code and store the decrypted further program code on the security data processing device, and using the security data processing device to store the further program code on the target data processing device.

The method of the second aspect may advantageously further comprise receiving the security data processing device on which is also stored further program code for storage on the target data processing devices, and using the security data processing device to store the further program on the target data processing device.

It is envisaged that the program code stored on the target data processing devices that is enabled by the method of the invention would typically include a portion executable by the target data processing device to validate the license key and enable another portion of the program code.

Alternatively, the further program code stored on the target data processing device could be executable to validate the license key and enable the program code stored on the target data processing devices that is enabled by the methods of the invention.

The instructions stored on the security data processing device may advantageously be executable by the security data processing device to generate a license key, which license key, when stored on the target data processing device, enables selected portions of the program code stored on the target data processing device, the selected portions being specified by the instructions stored on the security data processing device.

Using the security data processing device to obtain the device identifier may advantageously comprise using the security data processing device to obtain a device cryptographic certificate including the device identifier.

In an embodiment of the first aspect of the invention, receiving the encrypted value comprises receiving a data carrier on which is stored the encrypted value, and using the security data processing device to decrypt the encrypted value and store the decrypted value on the security data processing device comprise using a hardware security module (HSM) to decrypt the encrypted value and store the decrypted value on the HSM.

Alternatively, receiving the encrypted value may comprise receiving it via an Internet connection on an HSM and using the HSM to decrypt the encrypted value and store it on the HSM.

A suitable HSM for use in the method of the invention is a Thales Solo HSM.

In an embodiment of the second aspect of the invention, receiving the security data processing device on which are stored the value and the instructions for execution by the security data processing device comprises receiving a Java® card on which are stored the value and the instructions.

A suitable Java® card is a Gemalto IDcore 10 Java® card.

Where a Java® card is used as the security data processing device, it also has stored on it instructions executable by the card to carry out the method of the invention.

The license key may, for example, comprise at least a portion of the device identifier of the target data processing device.

Preferably, however, to increase the difficulty of identification of the license key by untrusted entities, the license key is derived from at least a portion of the device identifier of the target data processing device.

Because the device identifier is, by design, easy to obtain from the target data processing device, use of a license key comprising at least a portion of the device identifier could undermine the security of the method of the invention, because it could aid identification of the license key when the license key is stored on the target data processing device.

It is preferable that the license key be derived from at least a portion of the device identifier, and more preferably from the entire device identifier, for example by means of a cryptographic hash function, in order to make identification of the license key more difficult.

The method preferably includes the step of encrypting the license key, and the further program code if used, before storing it on the target data processing device.

Receiving the encrypted value and instructions may advantageously comprise receiving an encrypted cryptographic certificate including the value and the instructions and signed by a trusted entity.

The trusted entity may, for example, be a provider of the program code stored on the target data processing devices.

According to a third aspect of the invention there is provided a security data processing device comprising a processor and a memory, the memory having stored on it a value of a permitted number of target data processing devices that are permitted to have program code stored on them enabled, and instructions executable by the processor to cause the security data processing device to:

determine whether the value of the permitted number of target data processing devices is greater than zero;

if so, obtain a device identifier from a target data processing device;

generate a license key from the device identifier;

store the license key on the target data processing device; and decrement the value of the permitted number of target data processing devices.

In a preferred embodiment of the invention the security data processing device is a Java® card.

According to a fourth aspect of the invention there is provided a data processing device comprising a processor and a memory, the memory having stored on it a device identifier, a license key and first and second portions of program code, the first portion of program code being executable by the processor to read the device identifier and license key from the memory, validate the license key using the device identifier and, only if the validation is successful, permit execution of the second portion of program code.

The first portion of the program code may advantageously be executable by the processor to validate the license key by comparing the license key with at least a portion of the device identifier.

Preferably the first portion of the program code is executable by the processor to validate the license key by verifying a cryptographic certificate including the device identifier using public key cryptography.

A suitable data processing device for use as a target data processing device is a Renesas S5 or S7 microcontroller.

The important characteristic of a target data processing device for carrying out the invention are that it must be able to store and provide on request a device identifier.

BRIEF DESCRIPTION OF THE DRAWINGS

The invention will now be described, by way of example, with reference to the attached drawing figures, in which.

DETAILED DESCRIPTION OF EMBODIMENTS

Figure 1:
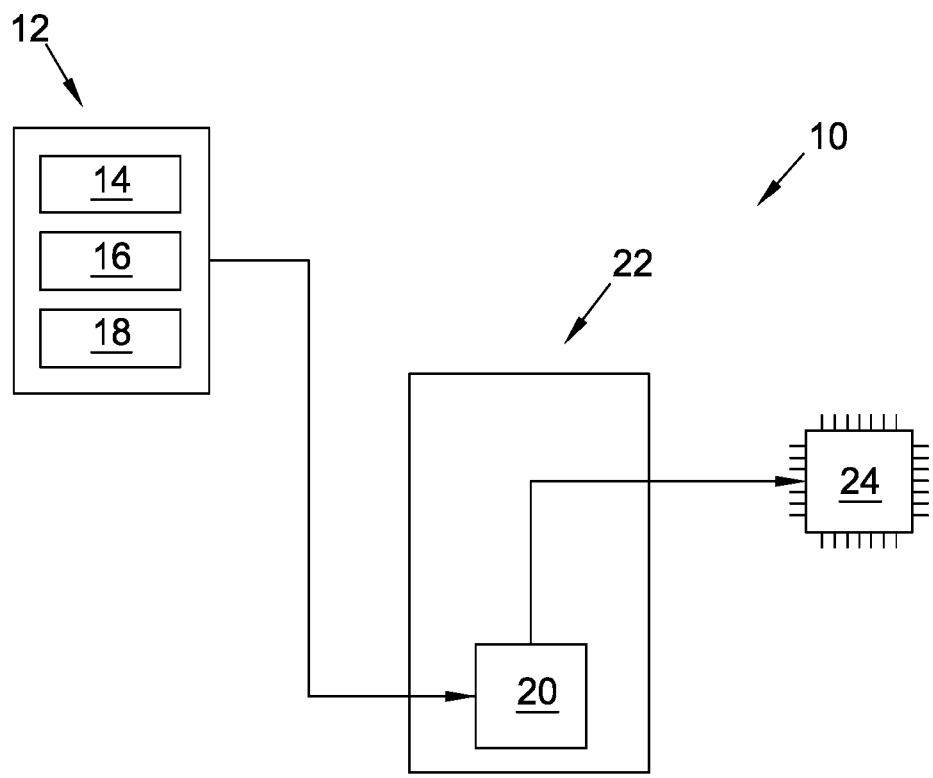
FIG. 1 is a schematic representation of a first embodiment of the method of the invention.

The method 10 of FIG. 1 comprises receiving a smart card 12 in the form of a Java® card containing a cryptographic certificate that includes a value 14 of a permitted number of target data processing devices, further program code 16 for storage on target data processing devices and instructions 18 for execution by a hardware security module (HSM), the certificate having been signed using a private key of a public key encryption key pair of a developer of the further program code 16.

The smart card 12 establishes a shared key using public key cryptography with an HSM 20 that forms part of a device programmer 22. The smart card encrypts the cryptographic certificate using the shared key and transmits the encrypted certificate to the HSM 20 via a smart card reader (not shown) of the HSM. The HSM decrypts the encrypted cryptographic certificate and uses a public key of the key pair of the developer of the program code 16 to verify that the certificate was in fact signed by the developer.

In order to prevent an untrusted entity from reusing the smart card, the HSM generates a cryptographic certificate including a zero value of the permitted number of target data processing devices, stores the certificate on the smart card 12 and verifies that the certificate has been correctly stored on the smart card. Unless the verification is successful, the HSM stops the method.

If the smart card is subsequently presented to an HSM, the zero value of the permitted number of target data processing devices will be transmitted to the HSM and the HSM will stop the method when it checks that the value of the permitted number of target data processing devices is greater than zero.

The HSM 20 obtains a device cryptographic certificate from a target data processing device 24, the certificate including a device identifier and being signed by a trusted entity such as a manufacturer of the target data processing device 24 or the developer of the further program code 16. The HSM 20 verifies that the certificate was in fact signed by the trusted entity, using the public key of a key pair of the trusted entity. If the verification is successful, the HSM executes the instructions 18, which causes the HSM to generate a license key from the device identifier of the target data processing device 24, using a cryptographic hash function.

The HSM establishes a shared key with the target data processing device 24 using public key cryptography and encrypts the license key and the further program code 16 for storage on the target data processing device using the shared key. The HSM causes the device programmer 22 to store the encrypted license key and further program code on the target data processing device 24. The target data processing device decrypts the license key and further program code using the shared key and stores the decrypted license key and further program code in the memory of the target data processing device.

It will be appreciated that where the target data processing device includes a protected region of the memory, it would be prudent to store the license key and further program code in the protected region.

The further program code stored in the memory is executable by the target data processing device 24 to obtain the device identifier of the target data processing device, generate a test code from the device identifier using the same cryptographic hash function as was used by the HSM to generate the license key, to compare the test code with the license key stored in the protected region of the memory, and to prevent other program code stored in the memory from being executed unless the license key and the test code match.

Where the target device has a protected region of the memory, the protected region of the memory may be protected in various ways that will be familiar to those skilled in the art, such as being accessible only at boot time, or being accessible only when the target data processing device is operating in a secure mode.

The invention enables a provider of program code to have a disabled version of program code stored on a large number of target data processing devices, and to control on how many of the target data processing devices the program code is enabled.

Figure 2:
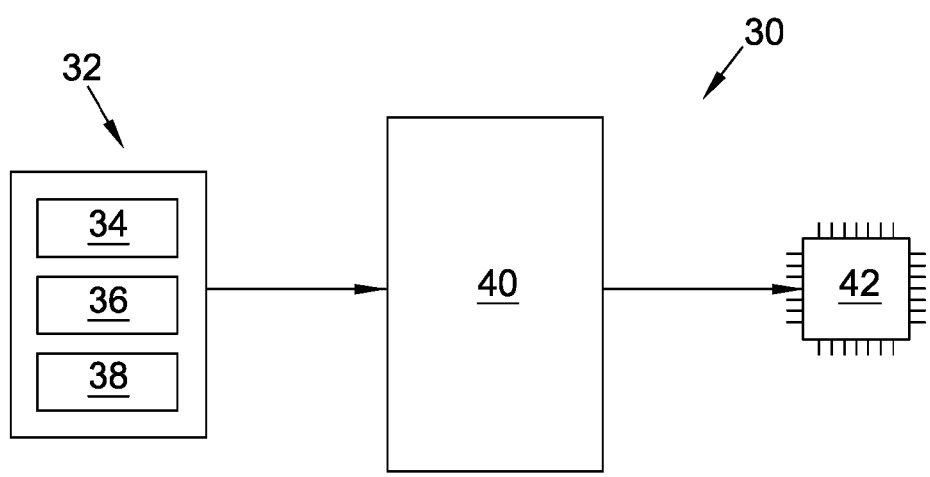
FIG. 2 is a schematic representation of a second embodiment of the method of the invention.

The method 30 of FIG. 2 comprises receiving a security data processing device in the form of a Java® card, i.e., a smart card 32, containing a value 34 of a permitted number of target data processing devices, further program code 36 for storage on target data processing devices and instructions 38 for execution by the smart card 32.

The smart card 32 executes the instructions 38, which causes the smart card to obtain, via a device programmer 40, a device cryptographic certificate from a target data processing device 42, the certificate including a device identifier and being signed by a trusted entity.

The smart card verifies that the device certificate was in fact signed by the trusted entity, using a public key of a key pair of the trusted entity. If the verification is successful, the smart card establishes a shared key with the target data processing device 42 using public key cryptography.

Execution of the instructions 38 causes the smart card to generate a license key from the device identifier of the target data processing device 42, using a cryptographic hash function.

The smart card encrypts the license key and the further program code 36 for storage on the target data processing device using the shared key and stores the encrypted license key and further program code on the target data processing device via the device programmer 40.

As in the method of FIG. 1, the target data processing device 42 decrypts the license key and further program code using the shared key and stores the decrypted license key and further program code in a protected region of the memory of the target data processing device.

The further program code stored in the protected region of the memory is executable by the target data processing device to carry out the same functions as described above in relation to FIG. 1, which will therefore not be repeated.

Each time a target data processing device is presented to the device programmer, the smart card 32 checks whether the value 34 stored on the smart card is greater than zero, and, if so, decrements the value 34 then carries out the steps set out above. Otherwise the smart card stops the method. It is envisaged that, when the value stored on the smart card reaches zero, the smart card would simply be discarded.

Figure 3:
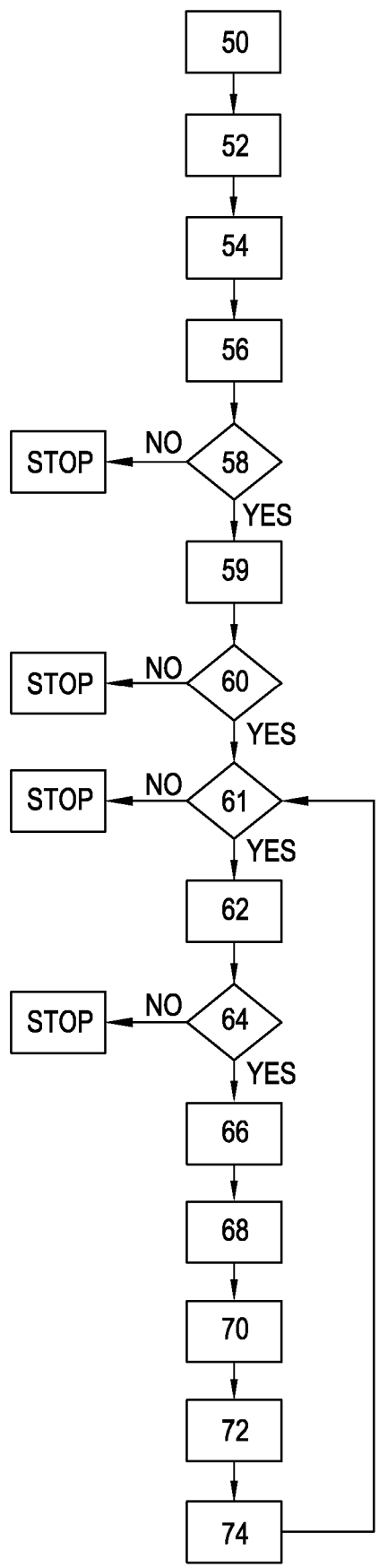
FIG. 3 is a flow diagram of the method of FIG. 1.

Turning to FIG. 3, this shows in more detail as a flow diagram the method of FIG. 1.

At step 50 the smart card containing the cryptographic certificate including the value of the permitted number of target devices, program code for storage on target data processing devices and instructions for execution by the HSM is received.

At step 52 the smart card establishes the shared key with the HSM.

At step 54 the smart card encrypts the certificate using the shared key and transmits it to the HSM.

At step 56 the HSM decrypts the encrypted certificate using the shared key.

At step 58 the HSM verifies that the certificate was signed by a trusted entity. If the verification fails, the method stops.

If the verification is successful, at step 59 the HSM generates a new cryptographic certificate including a zero value of the permitted number of target data processing devices and stores the new certificate on the smart card.

At step 60 the HSM verifies that the new certificate has been correctly stored on the smart card. If the verification fails, the method stops.

If the verification is successful, at step 61 the HSM determines whether the value of the permitted number of target data processing devices is greater than zero. If the determination fails, the method stops.

If the determination is successful, at step 62 the HSM decrements the value and obtains the device certificate from the target data processing device.

At step 64 the HSM verifies that the device certificate was signed by a trusted entity. If the verification fails, the method stops.

If the verification is successful, at step 66 the HSM generates the license key from the device identifier.

At optional step 68 the HSM establishes the shared key with the target device, at optional step 70 the HSM encrypts the license key and program code using the shared key and at step 72 the HSM stores the (optionally encrypted) license key and program code on the target device.

At step 74 the HSM verifies that the license key and program code have been correctly stored on the target device. If the verification fails, the HSM provides an indication that the verification has failed.

The flow returns to step 61 to await presentation of another target device to the device programmer.

Figure 4:
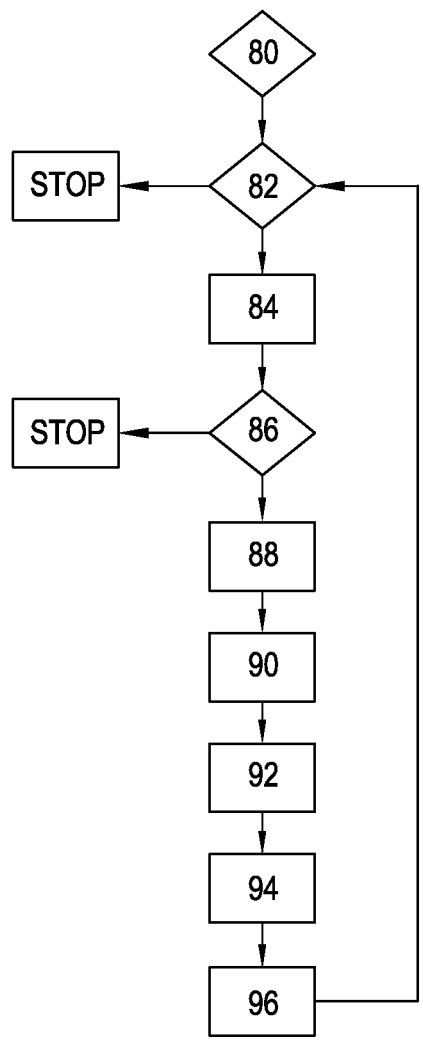
FIG. 4 is a flow diagram of the method of FIG. 2.

FIG. 4 shows in more detail as a flow diagram the method of FIG. 2.

At step 80 the smart card containing the value of the permitted number of target devices, further program code for storage on target data processing devices and instructions for execution by the smart card is received.

At step 82 the smart card determines whether the value of the permitted number of devices is greater than zero. If the determination fails, the method stops.

If the determination is successful, at step 84 the smart card obtains the device certificate from the target device.

At step 86 the smart card verifies that the device certificate was signed by a trusted entity. If the verification fails, the method stops.

If the verification is successful, at optional step 88 the smart card establishes a shared key with the target device, at step 90 the smart card generates the license key from the device identifier and decrements the value of the permitted number of target devices, at optional step 92 the smart card encrypts the license key and further program code for storage on the target device using the shared key, and at step 94 the smart card stores the (optionally encrypted) license key and further program code on the target device.

At step 96 the smart card verifies that the license key and further program code have been correctly stored on the target device. If the verification fails, the smart card causes an indication that the verification has failed to be generated.

The flow returns to step 82 to await presentation of another target device to the device programmer.

Figure 5:
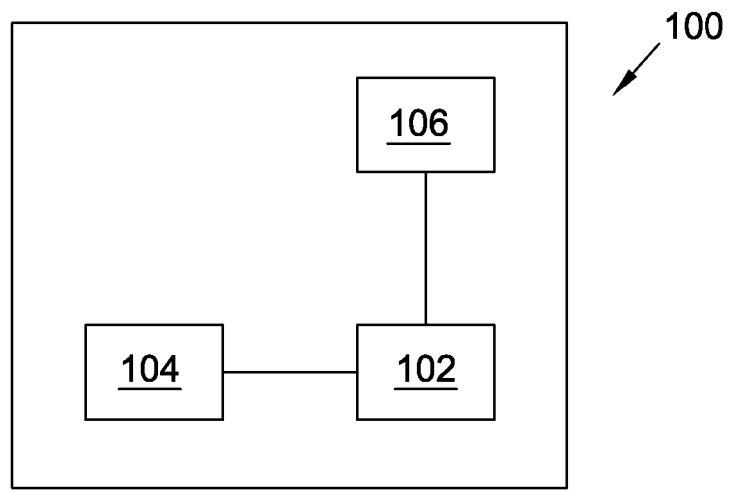
FIG. 5 is a block diagram of a security data processing device in accordance with the invention.

FIG. 5 is a block diagram of a security data processing device in accordance with the invention in the form of a Java® card 100. The card 100 is of conventional construction, comprising a secure processor 102, a secure memory 104 and an input/output interface 106.

The secure memory 104 contains instructions executable by the processor 102 to carry out the steps of determining whether the value of the permitted number of target devices is greater than zero, obtaining a device cryptographic certificate from a target device, generating a license key from a device identifier included in the device certificate, encrypting the license key and program code for storage on the target device and decrementing the value of the permitted number of target devices.

Figure 6:
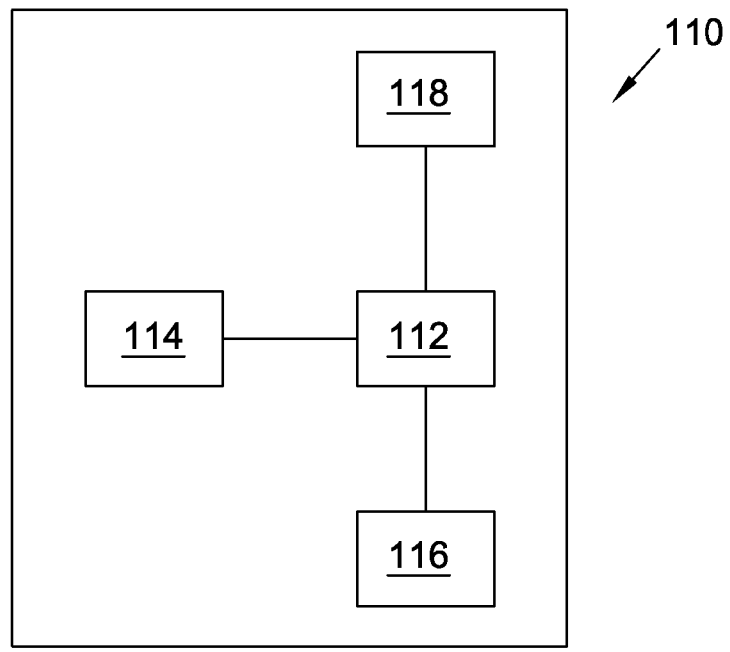
FIG. 6 is a block diagram of a target data processing device in accordance with the invention.

FIG. 6 is a block diagram of a target data processing device in accordance with the invention in the form of a microcontroller 110. The microcontroller is of conventional construction, comprising a secure processor 112, a memory 114, a protected memory 116 and an input/output interface 118.

The protected memory 116 is shown in FIG. 6 as separate from the memory 114. It could however be a portion of the memory 114 to which access is restricted by the processor 112. The protected memory 116 contains program code executable by the processor 112 to obtain a device identifier from the memory 114, to derive from the device identifier a test code, to obtain a license key from the protected memory 116, compare the test code with the license key and, only if the test code matches the license key, permit other program code stored in the protected memory 116 to be executed.

It will be apparent that the above description relates only to selected embodiments of the invention, and that the invention encompasses other embodiments as defined by the claims set out hereafter.

The invention claimed is:

1. A method of enabling program code stored on target data processing devices, the method comprising:
receiving an encrypted value of a permitted number of target data processing devices that are permitted to have program code stored on them enabled, and using a security data processing device to decrypt the encrypted value and store the decrypted value on the security data processing device;
receiving encrypted instructions for execution by the security data processing device;
using the security data processing device to decrypt the encrypted instructions and store the decrypted instructions on the security data processing device; and
for each target data processing device, using the security data processing device to:
determine whether the value of the permitted number of target data processing devices is greater than zero;
if so, obtain a device identifier from the target data processing device;
generate a license key from the device identifier;
store the license key on the target data processing device; and
decrement the value of the permitted number of target data processing devices;
wherein using the security data processing device to generate the license key from the device identifier comprise generating the license key by execution of the decrypted instructions.

2. The method of claim 1, wherein using the security data processing device to generate the license key from the device identifier comprises generating the license key by executing instructions stored on the security data processing device by a provider of the security data processing device.

3. The method of claim 1, further comprising receiving encrypted further program code for storage on the target data processing devices, using the security data processing device to decrypt the encrypted further program code and store the decrypted further program code on the security data processing device, and using the security data processing device to store the further program code on the target data processing device.

4. The method of claim 1, wherein the program code includes a portion executable by the target data processing device to validate the license key and enable another portion of the program code.

5. The method of claim 3, wherein the further program code stored on the target data processing device is executable to validate the license key and enable the program code stored on the target data processing device.

6. The method of claim 1, wherein using the security data processing device to obtain the device identifier comprises using the security data processing device to obtain a device cryptographic certificate including the device identifier.

7. The method of claim 1, wherein receiving the encrypted value comprises receiving a data carrier on which is stored the encrypted value, and using the security data processing device to decrypt the encrypted value and store the decrypted value on the security data processing device comprises using a hardware security module to decrypt the encrypted value and store the decrypted value on the hardware security module.

8. The method of claim 1, wherein receiving the encrypted value comprises receiving the encrypted value via an Internet connection on a hardware security module and using the hardware security module to decrypt the encrypted value and store it on the hardware security module.

9. The method of claim 1, wherein the license key comprises at least a portion of the device identifier of the target data processing device, or the license key is derived from at least a portion of the device identifier of the target data processing device.

10. A method of enabling program code stored on target data processing devices, the method comprising:
receiving a smartcard on which are stored a value of a permitted number of target data processing devices that are permitted to have program code stored on them enabled and instructions for execution by the smartcard to generate a license key from a device identifier; and
for each target data processing device, using the smartcard to:
determine whether the value of the permitted number of target data processing devices is greater than zero;
if so, obtain a device identifier from the target data processing device;
generate a license key from the device identifier;
store the license key on the target data processing device; and
decrement the value of the permitted number of target data processing devices.

11. The method of claim 10, further comprising receiving the security data processing device on which is also stored further program code for storage on the target data processing devices, and using the security data processing device to store the further program on the target data processing device.

12. The method of claim 10, wherein the program code includes a portion executable by the target data processing device to validate the license key and enable another portion of the program code.

13. The method of claim 11, wherein the further program code stored on the target data processing device is executable to validate the license key and enable the program code stored on the target data processing device.

14. The method of claim 10, wherein said license key, when stored on the target data processing device, enables selected portions of the program code stored on the target data processing device, the selected portions being specified by the instructions stored on the security data processing device.

15. The method of claim 1, wherein using the security data processing device to obtain the device identifier comprises using the security data processing device to obtain a device cryptographic certificate including the device identifier.

16. The method of claim 10, wherein the smartcard is a Java card on which are stored the value and the instructions.

17. The method of claim 10, wherein the license key comprises at least a portion of the device identifier of the target data processing device, or the license key is derived from at least a portion of the device identifier of the target data processing device.

18. A security data processing device comprising a processor and a memory, the security data processing device configured to:
receive an encrypted value of a permitted number of target data processing devices that are permitted to have program code stored on them enabled;
decrypt the encrypted value and store the decrypted value in said memory;
receive encrypted instructions for execution by the security data processing device;

decrypt the encrypted instructions and store the decrypted instructions in said memory, and execute the decrypted instructions on said processor to:
determine whether the value of the permitted number of target data processing devices is greater than zero;
if so, obtain a device identifier from a target data processing device;
generate a license key from the device identifier;
store the license key on the target data processing device; and
decrement the value of the permitted number of target data processing devices.

19. A data processing device comprising a processor and a memory, the memory having stored on it a device identifier, a license key, a first portion of program code and a second portion of program code, the first portion of program code being executable by the processor to read the device identifier and license key from the memory, validate the license key using the device identifier and, only if the validation is successful, permit execution of the second portion of program code.

\* \* \* \* \*